(12) United States Patent
Kinsella

(10) Patent No.: US 9,431,901 B2
(45) Date of Patent: Aug. 30, 2016

(54) CHARGE PUMP STAGE AND A CHARGE PUMP

(71) Applicant: Analog Devices Global, Hamilton (BM)

(72) Inventor: Barry P. Kinsella, Dooradoyle (IE)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 14/160,225

(22) Filed: Jan. 21, 2014

(65) Prior Publication Data

US 2015/0207403 A1    Jul. 23, 2015

(51) Int. Cl.
G05G 1/10      (2006.01)
H02M 3/07      (2006.01)

(52) U.S. Cl.
CPC ............... *H02M 3/07* (2013.01); *H02M 3/073* (2013.01)

(58) Field of Classification Search
None
See application file for complete search history.

(56) References Cited

U.S. PATENT DOCUMENTS

| 6,177,829 B1* | 1/2001 | Jones et al. ............... 327/536 |
| 6,995,602 B2 | 2/2006 | Pelliconi |
| 8,456,225 B1* | 6/2013 | Snowdon ............... 327/536 |
| 2005/0206441 A1* | 9/2005 | Kimura ............... 327/536 |

FOREIGN PATENT DOCUMENTS

CN        101510728 A      8/2009

\* cited by examiner

*Primary Examiner* — Lincoln Donovan
*Assistant Examiner* — Khareem E Almo
(74) *Attorney, Agent, or Firm* — Schwegman Lundberg & Woessner, P.A.

(57) ABSTRACT

A charge pump cell, comprising: an input node; an output node; Q channels, where Q is an integer greater than one, and where at least two of the channels comprise: a capacitor; a unidirectional current flow device; an output diode; and a channel drive signal node; and wherein a first current flow node of the unidirectional current flow device is connected to a first node of the capacitor at a channel node, a second node of the capacitor is connected to the channel drive signal node, a second current flow node of the unidirectional current flow device is connected to the input node, and the output diode is connected between the channel node and the output node.

20 Claims, 4 Drawing Sheets

CHARGE PUMP STAGE AND A CHARGE PUMP

FIELD

This disclosure relates to charge pumps and charge pump stages, also known as charge pump cells, and to electronic devices including such charge pumps.

BACKGROUND

Many electronic devices are powered by relatively low voltage supplies. These devices are often portable, such as mobile phones, tablets and so on. Some parts of the circuits may require a voltage greater than that available from, say, a battery associated with the electronic device. There is a need for charge pumps and voltage boosters for use in low power electronic devices, such as portable communication devices, to generate increased voltages.

SUMMARY

According to a first aspect of this disclosure, there is provided a charge pump cell, comprising: an input node; an output node; Q channels, where Q is an integer greater than one, and where at least two of the channels comprise: a capacitor; a unidirectional current flow device; an output diode; and a channel drive signal node, and wherein a first current flow node of the unidirectional current flow device is connected to a first node of the capacitor at a channel node, a second node of the capacitor is connected to the channel drive signal node, a second node of the unidirectional current flow device is connected to the input node and the output diode is connected between the channel node and the output node.

The unidirectional current flow device may be a diode, or it may be an active rectifier such as a transistor which is controlled to switch between conducting and non-conducting states.

Each channel may receive a respective drive signal. Advantageously at least two of the drive signals are dissimilar. The drive signals may be time shifted versions of each other.

In an embodiment, the charge pump cell has two channels. It is therefore convenient for the drive signal to the second channel to be an inverted version of the drive signal supplied to the first channel. The drive signals may be arranged such that they do not overlap in an asserted state.

In another embodiment there may be three or more channels. In which three or more time shifted input signals may be used to drive the charge pump cell.

Where a transistor rectifier is provided as the unidirectional current flow device, the gate of the transistor may be driven in synchronization with the channel drive signal. The gate signal may be derived directly from the channel control signal, or it may be derived from the state of a neighboring channel.

In an embodiment of this disclosure, there is provided a charge pump stage having an input node and an output node, the charge pump stage comprising first and second transistors coupled to the input node by their respective drains, a gate of the second transistor coupled to a source of the first transistor at a first node, a gate of the first transistor coupled to a source of the second transistor at a second node, a first capacitor coupled between the first node and a first oscillator input node, a second capacitor coupled between the second node and a second oscillator input node, the first and second oscillator input nodes operable to receive first and second oscillatory signals in phase opposition, a first diode coupled between the first node and the output node, and a second diode coupled between the second node and the output node.

In a further embodiment of this disclosure, there is provided a charge pump stage having an input node and an output node, the charge pump stage comprising first and second transistors coupled to the input node by their respective sources, a gate of the second transistor coupled to a drain of the first transistor at a first node, a gate of the first transistor coupled to a drain of the second transistor at a second node, a first capacitor coupled between the first node and a first oscillator input node, a second capacitor coupled between the second node and a second oscillator input node, the first and second oscillator input nodes operable to receive first and second oscillatory signals in phase opposition, a first diode coupled between the first node and the output node, and a second diode coupled between the second node and the output node.

Because the charge pump stage is designed to receive two input signals in phase opposition, the charge pump stage transfers charge from the input node to the output node in both phases of oscillation. Thus, charge is transferred on each transition of the oscillator, leading to more efficient transfer of charge, decreased leakage, reduced ripple and potentially less high frequency noise in the charge pump output. Furthermore, because of the relatively smooth output voltage, smoothing capacitance need not be provided between the output and ground, further decreasing leakage. Alternatively the size of the smoothing capacitor may be reduced, thereby saving space.

Preferably, one or both of the first and second diodes is a Schottky diode. Thus the voltage dropped across the Schottky diodes is reduced relative to standard diodes or diode-wired MOSFETs. Using Schottky diodes reduces the voltage lost in the rectifying portion of the circuit, since the voltage drop across each of the first and second diodes may in the region of 0.15V or less. This leads to an increase in efficiency of the charge pump stage, particularly when implemented in low power architectures. Furthermore, the use of entirely passive components to transfer charge from the first and second capacitors to the output node decreases the complexity of the stage, providing a reduced semiconductor footprint with greater efficiency.

In an alternative, less preferable approach, one or more of the first and second diodes may be a silicon diode.

One or both of the first and second transistors are preferably N-type transistors, and may be MOSFETs.

The first and second transistors are preferably substantially matched. Equally, the first and second diodes may be substantially matched and the first and second capacitors may be substantially matched.

A single charge pump stage or cell may be used in isolation to form a charge pump. However several stages may be used in series to form a greater output voltage.

In some embodiments, a smoothing capacitor may be provided between the output node of the charge pump stage and ground.

According to a second aspect of this disclosure, there is provided a charge pump, comprising N charge pump stages (or cells) according to a first aspect of this disclosure, where N is any positive integer ≥2, and an oscillator having first and second oscillator outputs for providing first and second output signals in phase opposition, the first and second oscillator outputs coupled to respective first and second oscillator input nodes of each of the N charge pump stages, wherein a first charge pump stage of the N charge pump stages is arranged to receive an input voltage at its input node, and wherein each of the second charge pump stage to the N−1th charge pump stage have their respective input nodes coupled to the output node of the previous stage, and wherein the Nth charge pump stage has its input node coupled to the output node of the N−1th stage and is arranged to output an output voltage at its output node.

The oscillator may be powered by the input voltage at the input node of the first charge pump stage. As such, the first and second oscillator outputs may have a voltage range between 0V or ground and the input voltage, such as VDD.

The oscillator may output square wave signals at its first and second outputs

BRIEF DESCRIPTION OF THE DRAWINGS

Embodiments of charge pump cells and charge pumps will now be described, by non-limiting example only, with reference to the accompanying drawings, in which.

DESCRIPTION OF SOME EMBODIMENTS

Figure 1:
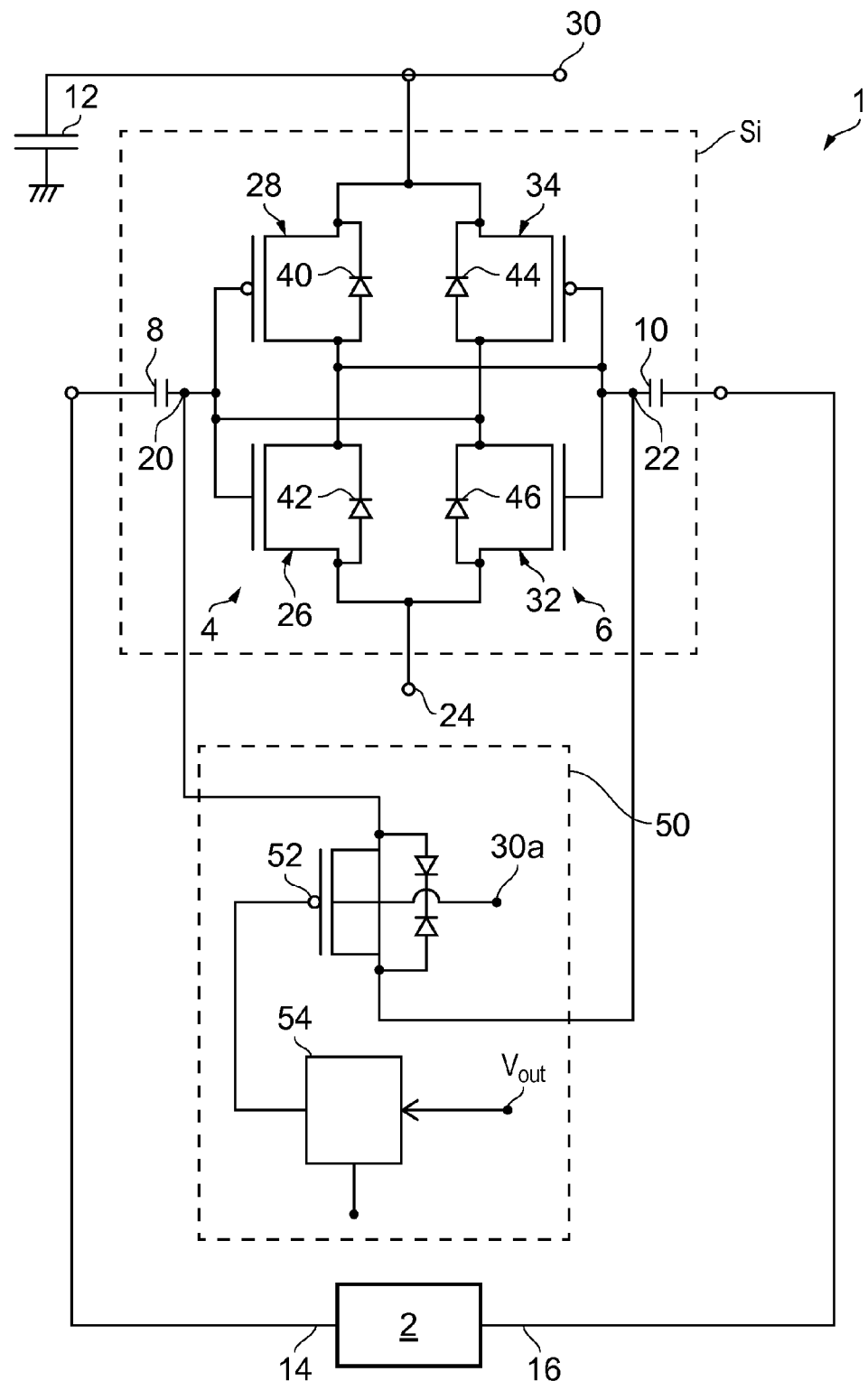
FIG. 1 is a schematic diagram of a single stage charge pump.

FIG. 1 shows a single stage charge pump 1 as described in U.S. Pat. No. 6,995,602. It includes an oscillator 2, first and second inverters 4, 6, first and second charge transfer capacitors 8, 10 and an accumulation capacitor 12. The oscillator 2 is driven with two reference voltages, such as $V_{DD}$ and $V_{SS}$ which may be 0V (GND). Typically $V_{DD}$ is equal to the supply rail voltage of the circuit in which the charge pump 1 is incorporated. For example, $V_{DD}$ may be equal to +5V. In lower power devices, such as portable devices, $V_{DD}$ may be in the region of between +1.2V and +3.5V. The oscillator 2 outputs first and second oscillatory signals in phase opposition at each of the first and second outputs 14, 16. The first and second oscillatory signals are typically in the form of square waves but may take other forms. The first charge transfer capacitor 8 has a first terminal coupled to the first output 14 of the oscillator 2 and a second terminal coupled to an input node 20 of the first inverter 4. The second charge transfer capacitor 10 has a first terminal coupled to the second output 16 of the oscillator 2 and a second terminal coupled to input node 22 of the second inverter 6. The first inverter 4 comprises an N type field effect transistor 26 having its source connected to a supply input node 24 and its drain connected to the drain of a P type field effect transistor 28 which has it source connected to a node 30. Similarly the second inverter comprises series connected N type and P type transistors 32 and 34, respectively, connected between the nodes 24 and 30. The inverters 4 and 6 are cross coupled such that the input node 20 of the first inverter is connected to the drain of the transistor 32 of the second inverter 6 and the input node 22 of the second inverter 6 is coupled to the drain of the transistor 26 of the first inverter 4. The body diodes 40, 42, 44 and 46 of the transistors are also illustrated. During operation, when the charge pump 1 is switched on and the supply voltage $V_{DD}$ or the output of a preceding stage is initially supplied to the supply input node 24, the accumulation capacitor 12 is initially in a discharged state and the voltage at the output node 30 moves towards $V_{DD}$-$2V_D$, $V_D$ being the voltage drop across each of the body diodes 40, 42, 44, 46 of the transistors 26, 28, 32 and 34. Typically $V_D$ is around 0.7 V for a MOSFET. At this point all four transistors are off and the capacitor 12 charges through the body diodes 40, 42, 44, and 46. When the difference between the positive supply voltage $V_{DD}$ and the output voltage becomes greater than the threshold voltage of the transistors 26, 28, 32 and 34, the transistors 26, 28, 32 and 34 can begin to conduct. The capacitors 8 and 10 supply charge to the accumulation capacitor 12 depending on the state of the oscillator signals 14 and 16. When a clock signal, for example signal 14 is low, then the associated capacitor 20 becomes charged to the voltage at node 24. When the output of the oscillator goes high, to a voltage Vosc, then the voltage at the node 20 becomes the sum of the voltage at node 24 and Vosc. Charge is transferred to the output node 30 on each clock edge of the oscillator by virtue of the two oscillator signals 14 and 16 being in antiphase For a single charge pump stage, Vosc and the voltage at node 24 are both likely to be $V_{DD}$. The output voltage of the charge pump 1 at node 30 is approximately equal to double the supply voltage $V_{DD}$ minus the voltage drop between the drain and source of either transistor 28 or 34 In low power circuits, where the supply rail voltage can be as low as +1.2V, the threshold voltage of the transistors may be a significant, and the low value of the voltage transitions at the gates of the transistors may result in an on resistance which gives rise to voltage drops of around 0.4 to 0.8V. Thus the reduction in voltage at the output node 30 due to the source-drain voltage drop across transistors 28 and 34 becomes significant when a load current is being drawn. The circuit disclosed in FIG. 1 also includes a protection circuit 50 comprising a transistor which receives a signal from a level shifting circuit 54 that receives the output voltage Vout from the final stage of the charge pump stages. The transistor 52 is arranged to be switched on when the charge pump is not operating. The charge pump needs this additional circuit to prevent the gate voltage at any of the transistors being sufficiently high to cause breakdown of the MOS transistors that constitute the inverters.

Figure 2:
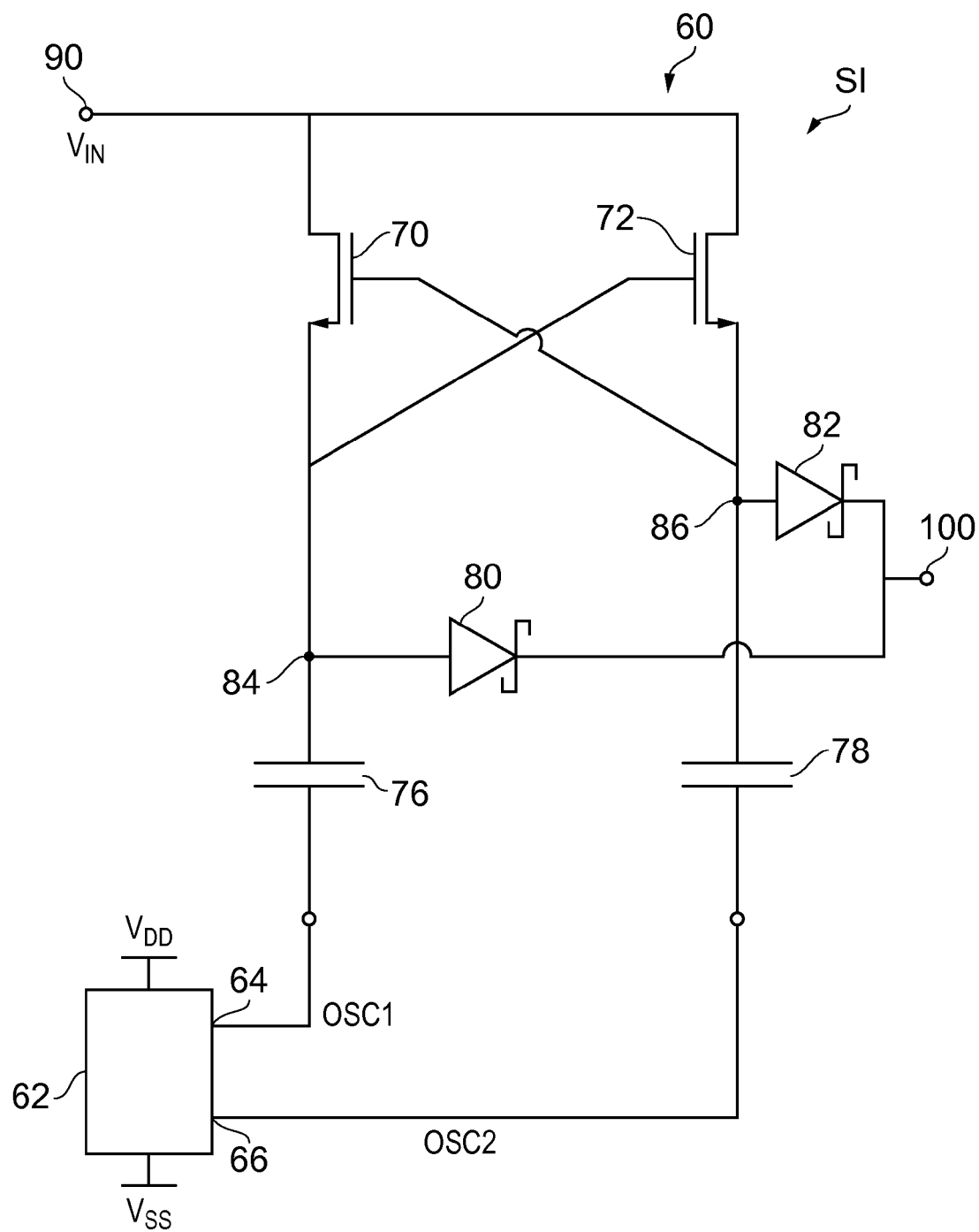
FIG. 2 is a schematic diagram of a single charge pump cell in accordance with this disclosure.

A charge pump 60 according to an embodiment of this disclosure is shown in FIG. 2. The charge pump 60 is shown having a single stage S1. However, in other embodiments such as that shown in FIG. 3, where like numbering has been adopted for like parts, the single stage S1 may be one of N stages S1, S2 . . . SN connected in series. Like the oscillator shown in FIG. 1, an oscillator 62 has first and second outputs 64 and 66 which provide first and second oscillating signals OSC1, OSC2, such as square waves, in phase opposition. The charge pump 60 further comprises a pair of cross coupled NMOS transistors 70 and 72, a pair of charge transfer capacitors 76 and 78, and a pair of Schottky diodes 80 and 82. Capacitor 76 is coupled at one of its terminals to the first output 64 of the oscillator 62, and at its other terminal, via node 84, to the source of transistor 70, the gate of transistor 72 and the anode of diode 80. The capacitor 78 is coupled at one of its terminals to the second output 66 of the oscillator 62, and at its other terminal via node 86, to the source of transistor 72, the gate of transistor 70 and the anode of diode 82. Drains of the transistors 70 and 72 are coupled together at an input node 90 and cathodes of diodes 80 and 82 are coupled together at an output node 100.

The oscillator is driven by two reference voltages, typically $V_{DD}$ and 0V (GND). As such, when the first output OSC1 is at $V_{DD}$, the second output OSC2 is at 0V and vice versa.

The charge pump 60 operates as follows. During a first phase, OSC1 is at 0V and OSC2 is at $V_{DD}$. Transistor 70 is therefore switched on, coupling node 84 to the voltage $V_{IN}$ at the input node 90. Thus the capacitor 76 becomes charged. The transistor 72 remains non-conducting because its gate voltage does not exceed its source voltage. When the clocks change such that OSC1 is at $V_{DD}$ and OSC2 is at 0V, then voltage at node 84 rises to approximately 2 $V_{DD}$. This turns the transistor 72 on so that it connects node 86 to the input node 90 so as to charge the capacitor 78. Additionally the diode 80 may become forward biased so as to transfer charge towards the output node 100 if the voltage at that node is more than one diode voltage drop below that of the voltage at node 84. Meanwhile node 86 gets pulled down to close to 0V by OSC2 going low and as a result the transistor 70 is switched off as its gate voltage is lower than its source voltage. Once the clocks change again, transistor 72 is switched off, the voltage at node 86 rises to approximately the sum of VIN and $V_{DD}$ and hence the diode 82 can become forward biased to transfer charge towards the output node 100, and transistor 70 is switched on so as to charge the capacitor 76 ready for the next clock change. It will be appreciated that in embodiments comprising multiple stages such as that shown in FIG. 3, output node 100 of a first stage S1 can be connected to the input node 90-2 of the next stage S2 and so on.

Figure 3:
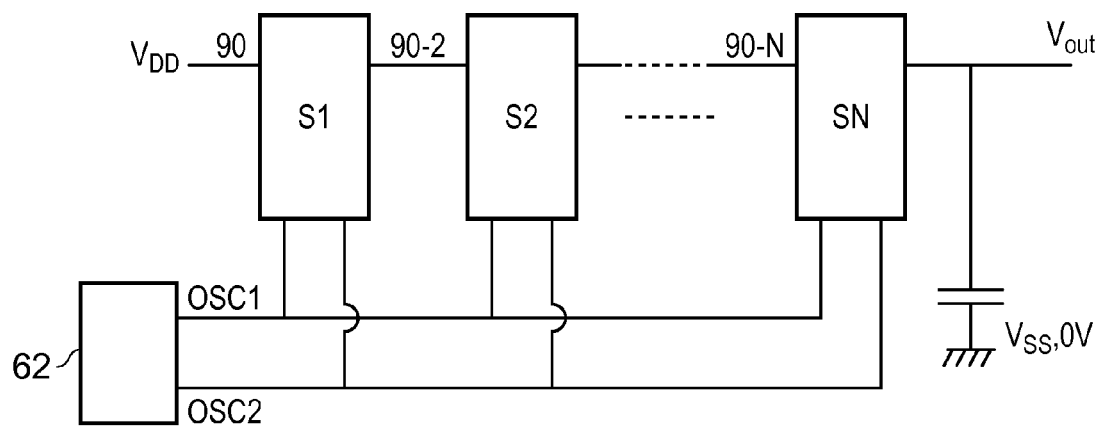
FIG. 3 is a schematic diagram of a multistage charge pump in accordance with this disclosure.

The charge pumps shown in FIGS. 2 and 3 transfer charge from $V_{DD}$ to their output nodes in both the first phase and the second phase of the oscillator 62. By transferring charge on both rising and falling edges, charge is transferred more often to the output, leading to more efficient transfer of charge, decreased leakage and less high frequency noise in the charge pump. Furthermore, because of the relatively smooth output voltage, smoothing capacitance need not be provided between the output and ground, further decreasing leakage.

It can also be seen that the use of Schottky diodes 80 and 82 significantly reduces the voltage lost in the rectifying portion of the circuit, since the voltage drop across each of the diodes 80 and 82 may be as little as 0.15V or even less in some circumstances. This leads to an increase in efficiency of the charge pump stage S1, particularly when implemented in low power architectures. Furthermore, the use of entirely passive components to transfer charge from the capacitors 76 and 78 to the output node 100 decreases the complexity of each stage S1-SN, providing a reduced semiconductor footprint and greater device efficiency. Further as each diode 80 and 82 is self controlling, in that it conducts as soon as it becomes forward biased by only a fraction of a volt, it prevents the gate voltage at the cross coupled transistors from becoming sufficiently great compared to $V_{IN}$ to cause breakdown within the transistors. Whilst the diodes 80 and 82 used in the charge pumps of FIGS. 2 and 3 are Schottky diodes, it will be appreciated that each charge pump could equally be implemented using other types of diodes, albeit with less efficiency. Other types of diodes may include standard silicon diodes or other suitable diodes known in the art.

It will be appreciated that the charge pumps described above may be implemented using discrete components or implemented on one or more integrated circuits. It will also be appreciated that one or more charge pumps and/or stages thereof may be fabricated on the same or multiple integrated circuits. It will be appreciated that charge pumps can also be designed and operated to produce negative voltages. Furthermore, and less intuitively a further embodiment can be formed by taking the arrangement shown in FIG. 2 and swapping the drain and source connections over. Thus the sources of the N type transistors 70 and 72 can be connected to the node 90, and the drains of the first transistor 70 can be connected to node 84. The gate of the second transistor remains connected to the node 84. Similarly the drain of the second transistor is connected to node 86, and the gate of the first transistor remains connected to node 84. Thus when, for example OSC2 goes high, the voltage at node 86 increases above Vin and switches transistor 70 on to charge the capacitor 76 while capacitor 78 is available to supply charge to the output 100. When the clocks swap state transistor 70 switches off and transistor 72 switched on, so that capacitor 76 can provide charge to the output node 100 while capacitor 78 is charging.

Figure 4:
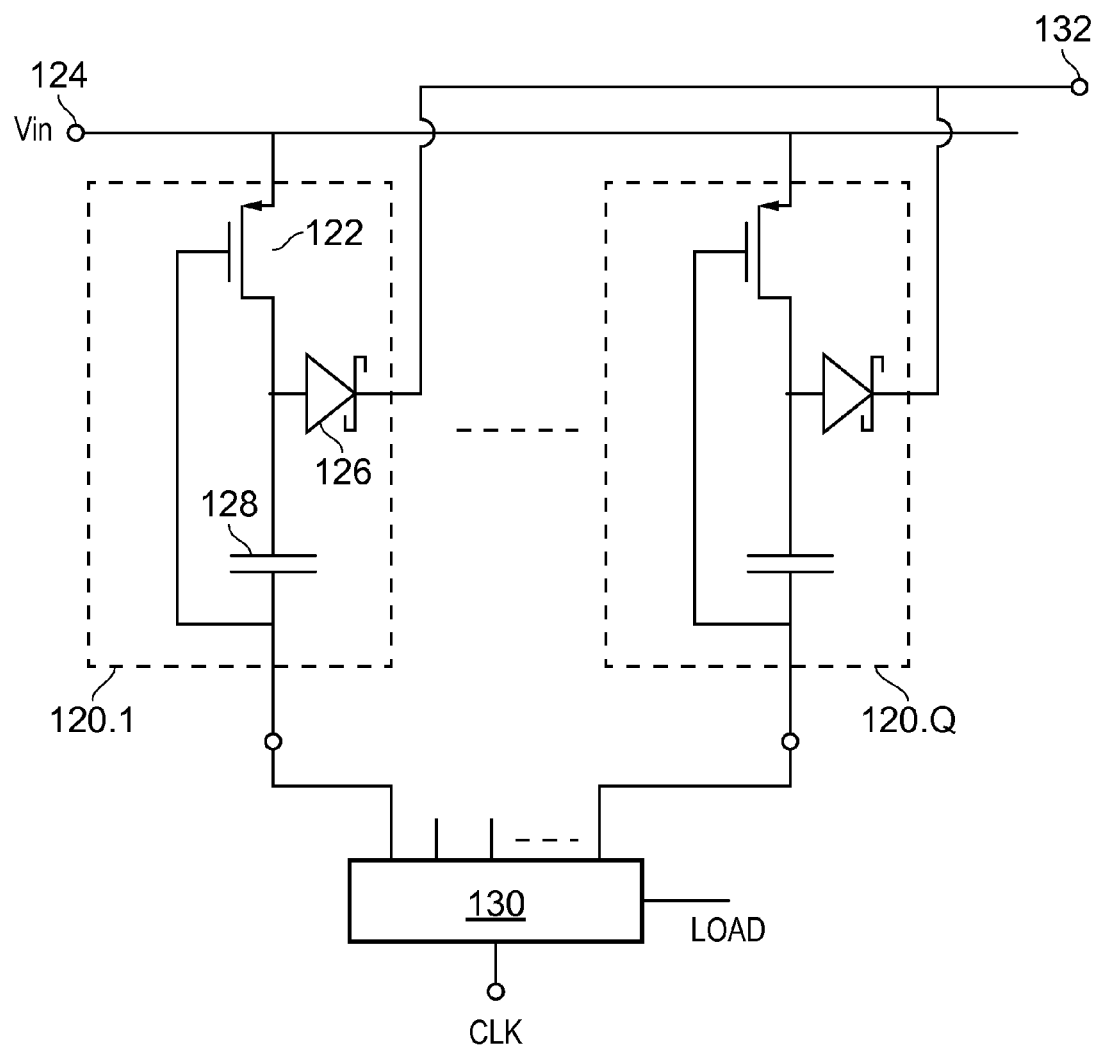
FIG. 4 is a circuit diagram of a charge pump voltage doubler constituting an embodiment of this disclosure.

FIG. 4 shows a further embodiment of a charge pump usable as a voltage doubler and comprising a plurality of stages 120.1 to 120.Q in parallel. Each stage is identical, so only the first stage 120.1 will be described in detail. The first stage 120.1 comprises a transistor 122, which in this example is a P type field effect transistor. The transistor 122 has its source connected to an input node 124 to receive an input voltage $V_{IN}$. The drain of the transistor is connected to the anode of a diode 126 and to a first plate of a capacitor 128. A second plate of the capacitor 128 is arranged to receive an oscillating signal from a signal generator 130. A cathode of the diode 126 is connected to an output node 132. A gate of the transistor 122 is connected to second plate of the capacitor 128. When the clock is low, the transistor 122 switched on, charging the capacitor 128 to $V_{IN}$ which in this example is $V_{DD}$. When the clock goes high ($V_{DD}$) then the transistor 122 is switched off and the voltage at the anode of the diode 126 rises to 2VDD. This forward biases it to supply charge to the output node 132 if the voltage at the output node is low enough. The stages in the arrangement shown in FIG. 4 are not cross coupled so do not mind if their clocks overlap. This enables a plurality of clock signals to be provided from the oscillator 130, and some of the clock can be disabled under light load conditions for example in response to a "load signal". Under conditions when all the clocks are running each clock may advantageously (but not necessarily) be offset from its neighbors by $2\pi/Q$ radians, where Q is the number of stages. The transistor may be replaced by a diode. The diodes may be Schottky diodes.

The claims presented herewith are drafted in single dependency format suitable for use at the US patent office. However it is to be understood that any claim may depend on any preceding claim of the same type unless that is clearly not technically feasible.

The invention claimed is:
1. A charge pump cell, comprising:
   an input node;
   an output node;
   Q channels, where Q is an integer greater than one, and where at least two of the channels comprise:
      a capacitor;
      a unidirectional current flow device;
      an output diode; and
      a channel drive signal node;
         wherein a first current flow node of the unidirectional current flow device is connected to a first node of the capacitor at a channel node,
         wherein a second node of the capacitor is connected to the channel drive signal node,
         wherein a second current flow node of the unidirectional current flow device is connected to the input node, wherein a first node of the output diode is directly connected to the output node, and wherein a second node of the output diode is directly connected to the channel node.

2. The charge pump cell of claim 1, wherein the unidirectional current flow device is a transistor.

3. The charge pump cell of claim 2, further comprising:
first and second transistors coupled to the input node by their respective drains, a gate of the second transistor coupled to a source of the first transistor at a first channel node, a gate of the first transistor coupled to a source of the second transistor at a second channel node;
a first capacitor coupled between the first channel node and a first channel drive signal node;
a second capacitor coupled between the second channel node and a second channel drive signal node, the first and second channel drive signal nodes operable to receive first and second oscillatory signals in phase opposition;
a first diode having n anode coupled to the first channel node and a cathode coupled to the output node; and
a second diode coupled between the second channel node and the output node.

4. The charge pump cell of claim 1, wherein at least one of the output diodes is a Schottky diode.

5. The charge pump cell of claim 1, wherein at least one of the output diodes is a silicon diode.

6. The charge pump cell of claim 1, wherein the unidirectional current flow device is an N-type MOSFET.

7. The charge pump cell of claim 3, wherein the first and second transistors are equally matched.

8. A charge pump, comprising N charge pump cells as claimed in claim 1, where N is any positive integer ≥2, and an oscillator having first and second oscillator outputs in phase opposition, first and second oscillator outputs coupled to respective first and second drive signal nodes of each of the N charge pump cells, wherein a first charge pump cell of the charge pump is arranged to receive an input voltage at its input terminal, and wherein each of the second charge pump cells to the N−1th charge pump cell have their respective input nodes coupled to the output node of the previous stage, and wherein the Nth charge pump stage has its input node coupled to the output node of the N−1th stage and is arranged to output an output voltage at its output node.

9. The charge pump of claim 8, wherein the first and second oscillator outputs are derived from an oscillator powered by the input voltage.

10. The charge pump of claim 9, wherein the first and second oscillator outputs have a voltage range between 0V or ground and the input voltage.

11. The charge pump of claim 8, wherein the first and second oscillators outputs output a square wave.

12. The charge pump cell of claim 2, further comprising:
first and second transistors coupled to the input node by their respective sources, a gate of the second transistor coupled to a drain of the first transistor at a first channel node, a gate of the first transistor coupled to a drain of the second transistor at a second channel node;
a first capacitor coupled between the first channel node and a first channel drive signal node;
a second capacitor coupled between the second channel node and a second channel drive signal node, the first and second channel drive nodes operable to receive first and second oscillatory signals in phase opposition;
a first diode coupled between the first channel node and the output node; and
a second diode coupled between the second channel node and the output node.

13. The charge pump cell of claim 1, wherein the at least two channels are configured to produce a negative voltage at the output node.

14. A method for generating an output voltage at an output node through charge pumping with aid from at least one diode, comprising:
applying a first oscillating signal to a control terminal of a first unidirectional current flow device to switch on the first unidirectional current flow device, thereby connecting an input voltage to a first terminal of a first capacitor so that the first capacitor is charged by the input voltage, wherein the first terminal of the first capacitor is directly connected to a first node of a first diode; and
generating a first portion of the output voltage by forward biasing the first diode, the first diode having a second node directly connected to the output node, wherein the forward biasing of the first diode is triggered by applying a second oscillating signal to a second terminal of the first capacitor, wherein the second oscillating signal is in phase opposition to the first oscillating signal such that the first portion is generated during a phase when the first capacitor is not being charged.

15. The method of claim 14, further comprising:
applying the second oscillating signal to a control terminal of a second unidirectional current flow device to switch on the second unidirectional current flow device, thereby connecting the input voltage to a first terminal of a second capacitor so that the second capacitor is charged by the input voltage, wherein the first terminal of the second capacitor is connected to a second diode; and
generating a second portion of the output voltage by forward biasing the second diode, wherein the forward biasing of the second diode is triggered by applying the first oscillating signal to a second terminal of the second capacitor such that the second portion is generated during a phase when the second capacitor is not being charged.

16. The method of claim 15, wherein the first and the second unidirectional current flow devices are triggered in a cross coupled manner by connecting the first terminals of the first capacitor and the second capacitor to the control terminals of the second unidirectional current flow device and the first unidirectional current flow device, respectively.

17. The method of claim 14, wherein the first diode is a Schottky diode.

18. The method of claim 14, wherein no active components are used to transfer charge from the first capacitor to an output node where the first portion of the output voltage is output by the first diode.

19. The method of claim 14, wherein the first unidirectional current flow device is a MOSFET.

20. The method of claim 14, wherein the first portion of the output voltage is a negative voltage.

* * * * *